Figure 1:
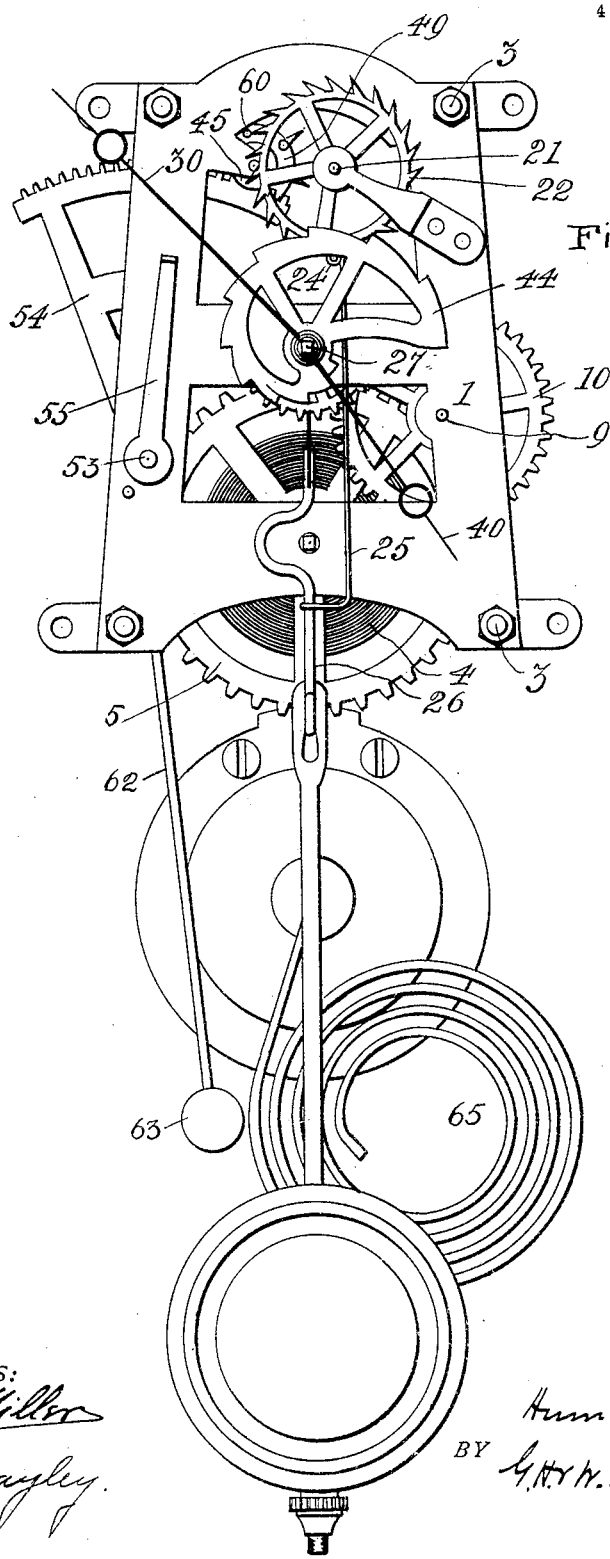

No. 806,337. PATENTED DEC. 5, 1905.
H. T. GAY.
STRIKING MECHANISM FOR CLOCKS.
APPLICATION FILED JUNE 1, 1905.

4 SHEETS—SHEET 1.

WITNESSES:
A. E. Miller
A. D. Bayley.

INVENTOR.
Human T. Gay,
BY G. H. & W. T. Howard,
ATTORNEYS

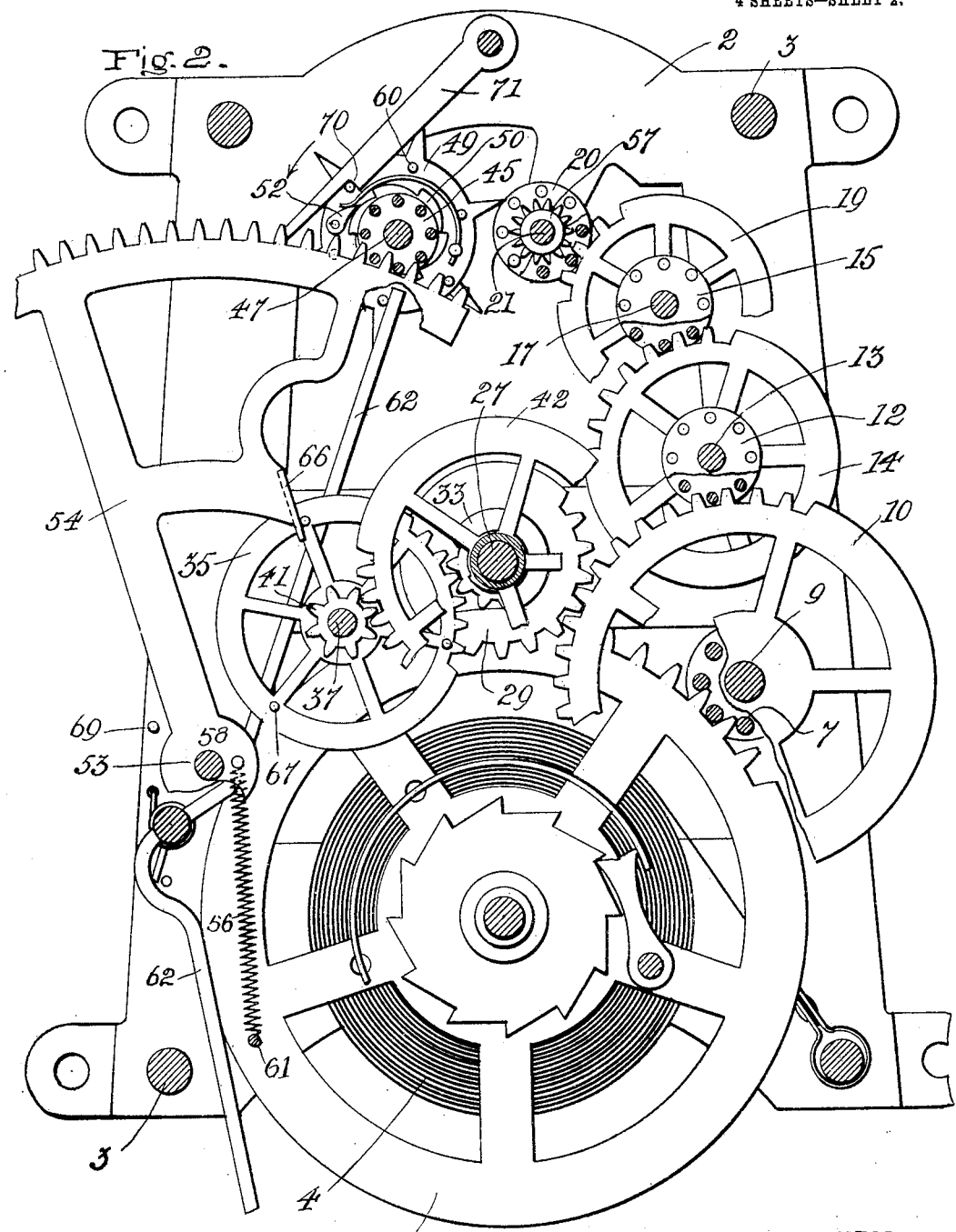

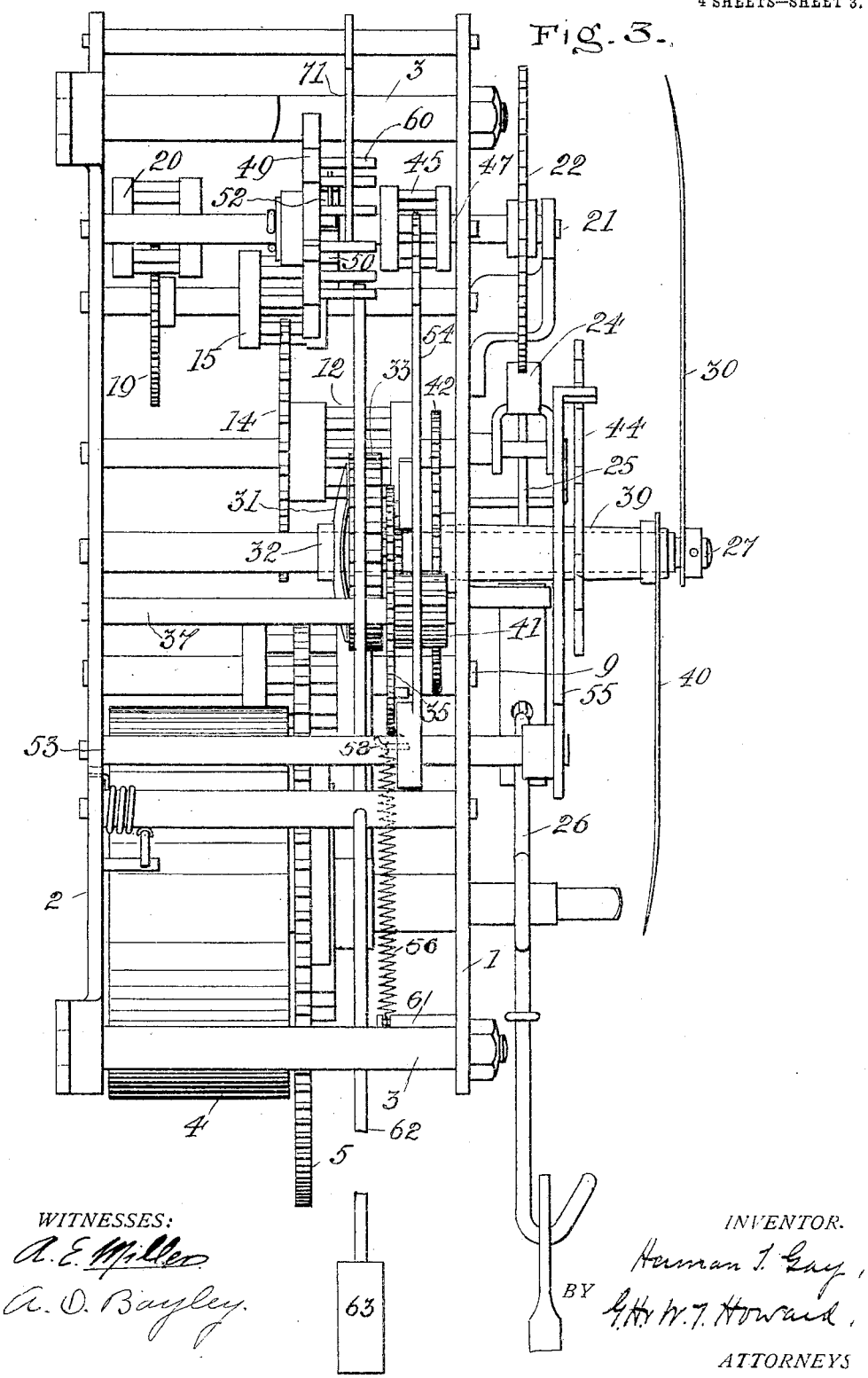

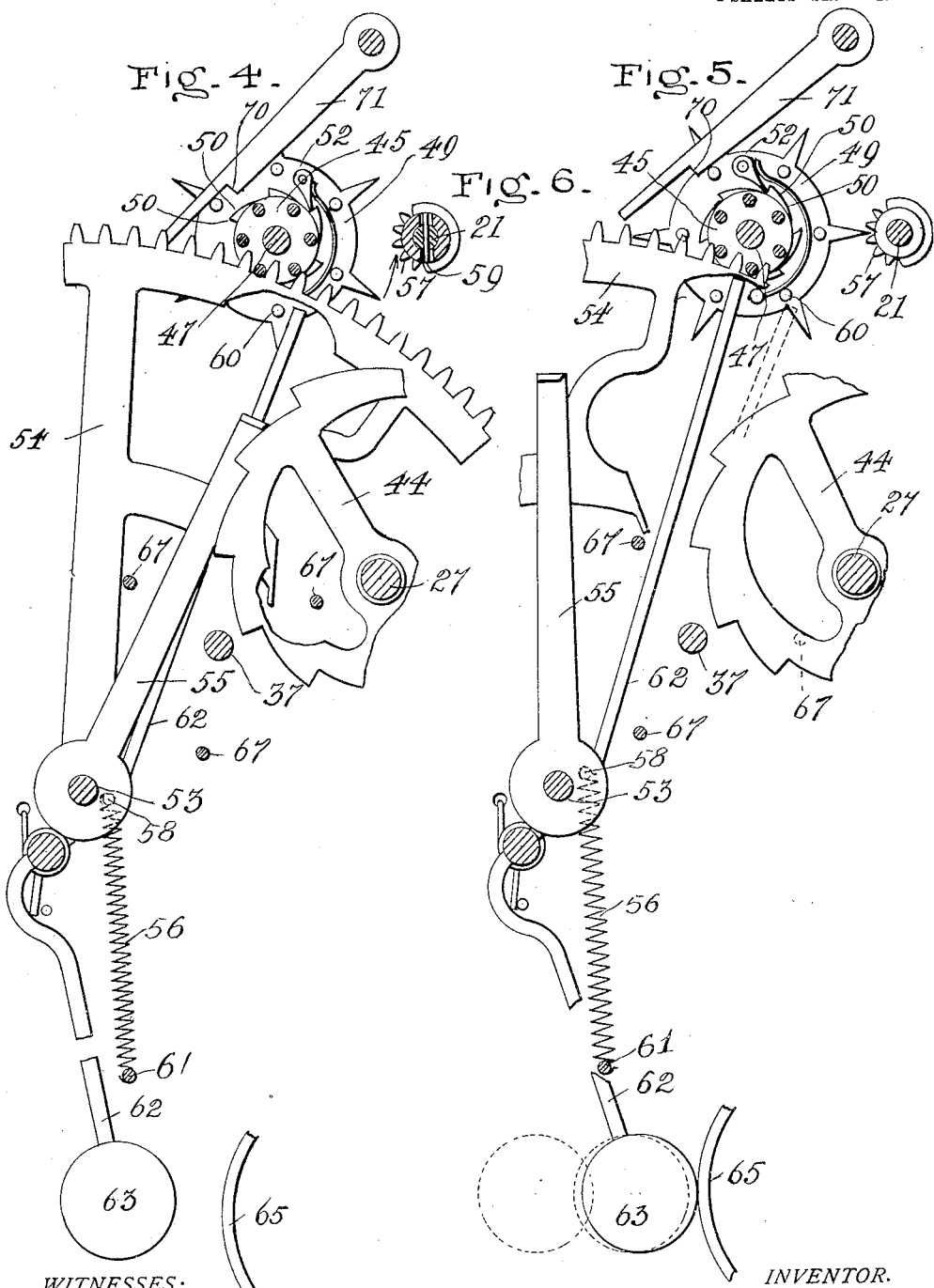

UNITED STATES PATENT OFFICE.

HERMAN T. GAY, OF BALTIMORE, MARYLAND, ASSIGNOR OF ONE-HALF TO JADWIGA WELZANT, OF BALTIMORE, MARYLAND.

STRIKING MECHANISM FOR CLOCKS.

No. 806,337.　　　　Specification of Letters Patent.　　　　Patented Dec. 5, 1905.

Application filed June 1, 1905. Serial No. 263,301.

*To all whom it may concern:*

Be it known that I, HERMAN T. GAY, of the city of Baltimore and State of Maryland, have invented certain Improvements in Striking Mechanism for Clocks, of which the following is a specification.

This invention relates to certain improvements in a striking mechanism for clocks, which is operated from the time-movement, as will hereinafter fully appear.

In the further description of the said invention which follows, reference is made to the accompanying drawings, forming a part hereof, and in which—

Figure 1 is an exterior front or face view of certain parts of a clock mechanism embracing the present invention. Fig. 2 is an enlarged sectional front view of the mechanism. Fig. 3 is a side view of the mechanism on the same scale as is Fig. 2 and illustrating certain parts of the mechanism omitted in that figure. Figs. 4, 5, and 6 are detached views of parts of the mechanism on the same scale as are Figs. 2 and 3.

Referring now to the drawings, 1 and 2 are respectively the front and the rear plate of the clock-frame connected, as is usual, by the studs 3.

Referring particularly to Fig. 2 of the drawings, 4 is the mainspring, and 5 is the mainspring-wheel in mesh with the pinion 7, tight on the shaft 9. 10 is the first wheel, also tight on the shaft 9 and in mesh with the pinion 12 on the shalt 13, which shaft carries with it the second wheel 14 in mesh with the pinion 15 on the shaft 17. The shaft 17 carries the third wheel 19 in gear with the pinion 20, which is tight on the shaft 21, to which is attached the escapement-wheel 22, a face view of which is shown in Fig. 1.

The escapement-anchor 24 is partially exhibited in Fig. 1, and a complete edge view of the same is shown in Fig. 3. The anchor-bar 25, however, is illustrated in both of the said figures, as is also the pendulum-rod 26.

27 is the minute spindle or arbor, which receives its movement from the shaft 9 through the medium of the wheels 10 and 29 and performs one complete rotation each hour.

30 is the minute-hand, tight on the spindle 27.

The wheel 29 is loose on the spindle 27 and driven by friction effected by means of a spring-disk 31, which bears against the tight collar 32 on the spindle and forces the said wheel against the tight pinion 33. The pinion 33 is in gear with the wheel 35, which is tight on the shaft 37, and its motion is communicated to the loose sleeve 39, carrying the hour-hand 40, through the medium of the pinion 41 and the wheel 42, fastened on the shaft 37 and the loose sleeve, respectively.

All the mechanism thus far described is commonly in use and well known, and consequently in itself forms no part of this invention.

44 is an ordinary cam or snail such as is found in many striking-clocks fastened to the loose sleeve 39, and in consequence performs one rotation in twelve hours.

45 is a pinion tight on the shaft 47, and 49 a star-wheel, shown as having six points, which is loose on the said shaft, but which has a rotation in common with said shaft in the direction indicated by the arrow in full lines in Fig. 2 through the medium of a ratchet-wheel 50, which is fastened to the said shaft, and the pawl 52, which is pivoted to the face of the star-wheel.

53 is a vibratory shaft journaled in the frame-plates 1 and 2, carrying a toothed segment 54, the teeth of which are in mesh with those of the pinion 45, carrying a stop-arm 55, which is situated exteriorly of the plate 1 of the clock-frame. The end of this arm is bent outward, so as to extend over the edge of the snail 44, (see Fig. 3,) to limit its downward movement and arrest the motion to the right of the toothed segment in the striking operation, hereinafter described.

57 is a star-pinion attached to the shaft 21 by means of a pin 59, (see Fig. 6,) which is fast in the shaft and loose in a hole in the hub of the pinion, whereby the said star-pinion is susceptible to a slight rotary movement independently of the shaft, for a purpose hereinafter described.

The points of the star-wheel and those of the star-pinion interfere, and should the star-wheel be influenced to rotate in the direction indicated in Fig. 4 by the arrow its movement would be stopped by the pinion; but should the pinion have fourteen points, as shown, and be in rotation the star-wheel would rotate a distance equal to that between its points for each one-fourteenth part of a rotation of the star-pinion.

By reference to Figs. 2, 4, and 5 it will be seen that the star-wheel 49 is provided with six horizontally-extending pins 60, each one of which in the rotation of the wheel trips the spring-held striking-arm 62 and causes its hammer 63 to sound the gong 65.

The wheel 35 (see particularly Figs. 2, 4, and 5) is fitted with three pins 67 and the toothed segment 54 provided with a face 66 of limited length, which is in the path of the said pins, and the wheel is so adjusted circumferentially with respect to the said face that during each hour one of the said pins will have pushed the segment to the left to its extreme limit and then passed from contact with the lower edge of the face, as shown in Fig. 5. The toothed segment being thus released from the actuating-pin will be drawn rapidly back or to the right until stopped by the end of the arm 55 striking the edge of the snail, as shown in Fig. 4. The movement of the toothed segment to the right just referred to is caused by the coiled spring 56, one end of which is attached to a pin 58, projecting from the hub of the segment and situated a short distance to the right from the vibrating shaft 53, and the other end secured to a stud 61, extending rearward from the front plate 1 of the clock-frame, as shown particularly in Fig. 3. In the back or return movement of the toothed segment just described the star-wheel will be intermittingly rotated and the striking-arm tripped by the pins 60, thus sounding the gong the number of times represented by the section of the snail upon which the end of the arm 55 falls.

To prevent the segment 54 being at any time manually pushed so far toward the left as to disengage its teeth from the pinion 45, the front frame-plate 1 is provided with a stop-pin 69. (Shown in dotted lines in Fig. 2.)

In the movement of the toothed segment to the left, effected by the clock mechanism, as described, no motion should be transmitted to the star-wheel, the pawl 52 clicking during the rotation of the pinion 45; but in practice it is found that there is sufficient friction between the moving ratchet-wheel 50 and the pawl 52 to cause the star-wheel to turn until one of its points engages with the star-pinion 57. This engagement of the points would have the effect of stopping the clock and is prevented by the shoulder 70 of the gravity-pawl 71 being in the path of the pins 60, and the said pawl is so placed that this stoppage of the star-wheel is effected when the points of the two wheels are out of contact, as shown in Fig. 2.

It has been stated that the star-pinion 57 has a limited rotary motion independently of the shaft 21. The object of this arrangement is to admit of the glancing of a point of the star-pinion should it come into direct alinement with a point of the star-wheel, thereby preventing the stopping of the clock-movement.

Supposing the time to be 4.53, the various parts of the clock will be in the position shown in Figs. 1 and 2—that is to say, the toothed segment moved by one of the pins 67 of the wheel 35 will have nearly reached its extreme outward position, and the section of the snail which represents five o'clock will be presented to the end of the arm 55. At the time that the minute-hand reaches a vertical position, it being then five o'clock, the said pin 67 will pass from the face of the segment and that device will spring backward, causing an intermittent rotation of the star-wheel produced by the rotation of the interfering star-pinion, and the striking-lever will be tripped five times by the pins 60.

It must be understood that the number of points of the star-wheel and star-pinion will vary with the character of the clock to which the present invention is applied. For instance, in the clock-movement shown the star-pinion will perform one and a half rotations in a minute and is provided with fourteen points. With this arrangement the star-wheel which has six points will make two rotations to strike twelve. In the case of a clock with a more rapid pendulum motion the star-pinion would have a less number of points or the striking would be too slow. This will be readily understood by those practically familiar with the construction of striking-clocks, and they will therefore arrange the star-wheel and its pinion to give the proper interval between the strokes of the gong.

I claim is my invention—

1. In a clock-movement, the combination with the mainspring thereof, of a striking mechanism comprising a snail having rotation in common with the hour-hand, a spring-held pivoted toothed segment carrying a stop-arm adapted to rest on the snail and thereby limit the vibration of the said segment in one direction, movement-transmitting devices whereby the said toothed segment is hourly thrown over and the stop-arm lifted from the snail, a pinion in mesh with the toothed segment, a wheel provided with pins which is driven by the said pinion in one direction only, and striking appliances which are actuated by the said pins in the return of the segment toward its original position, substantially as specified 2. In a clock-movement, the combination with the mainspring thereof, of a striking mechanism comprising a snail having rotation in common with the hour-hand, a spring-held pivoted toothed segment carrying a stop-arm adapted to rest on the said snail and thereby limit the vibration of the said segment in one direction, movement-transmitting devices whereby the said toothed segment is hourly thrown over and the stop-arm lifted from contact with the snail, a pinion in mesh with the said toothed segment, a star-wheel provided with pins which is driven by the said pinion in one direction only, striking appliances which are actuated by the said pins in the return of the toothed segment to its original position, and a star-pinion in constant rotation adapted to mesh with the star-wheel and thereby produce in the same an intermittent rotation, substantially as specified.

3. In a clock-movement, the combination with the mainspring thereof, of a striking mechanism embodying a snail having a rotation in common with the hour-hand, a vibratory toothed segment having a stop-arm adapted to seat on the snail, movement-transmitting devices whereby the said toothed segment is hourly moved over and the stop-arm lifted from the snail, a pinion in mesh with the said toothed segment, a star-wheel carrying pins, pawl-and-ratchet mechanism to communicate the rotation of the pinion to the said star-wheel in one direction only, gong-striking devices actuated by the pins on the star-wheel, and a star-pinion in constant rotation, arranged to mesh with the star-wheel and thereby effect an intermittent rotation of the same and produce a pause between the strokes of the gong, substantially as specified.

HERMAN T. GAY.

Witnesses:
OREGON MILTON DENNIS,
A. O. BAYLEY.